United States Patent [19]
Rhyne

[11] 3,843,918
[45] Oct. 22, 1974

[54] FERRORESONANT TRANSFORMER BATTERY CHARGER CIRCUIT

[75] Inventor: Earl C. Rhyne, Millis, Mass.

[73] Assignee: Gould Inc., Mendota Heights, Minn.

[22] Filed: Nov. 15, 1973

[21] Appl. No.: 416,114

[52] U.S. Cl.......................... 320/23, 320/39, 320/59
[51] Int. Cl. ............................................. H02j 7/04
[58] Field of Search ............ 320/37, 39, 40, 57, 59, 320/22, 23; 321/16, 68; 323/9

[56] References Cited
UNITED STATES PATENTS

| | | | |
|---|---|---|---|
| 2,600,249 | 6/1952 | Klinkhamer | 320/22 X |
| 3,090,904 | 5/1963 | Jensen | 320/37 X |
| 3,217,228 | 11/1965 | Jardine | 320/22 X |
| 3,521,147 | 7/1970 | Ostreicher | 320/39 X |

Primary Examiner—J. D. Miller
Assistant Examiner—Robert J. Hickey
Attorney, Agent, or Firm—Daniel Jay Tick

[57] ABSTRACT

A battery charger circuit comprises a ferroresonant transformer. A first rectifier circuit connected between the transformer and a battery provides a first rate of voltage. A second rectifier circuit connected in "piggy-back" with the first rectifier circuit between the transformer and the battery provides a second rate of voltage.

15 Claims, 6 Drawing Figures

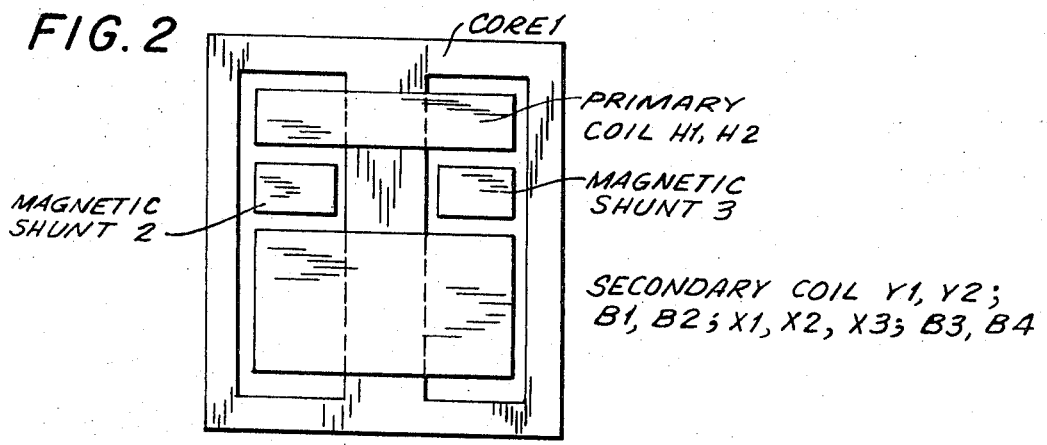
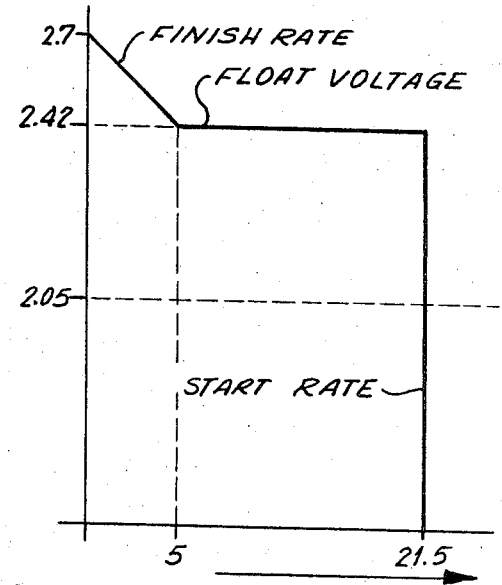

FERRORESONANT TRANSFORMER BATTERY CHARGER CIRCUIT

CROSS-REFERENCES TO RELATED APPLICATIONS

The present invention utilizes a ferroresonant transformer. Ferroresonant transformers are described and illustrated in many articles and United States patents, among which are those listed in a Bibliography of Ferroresonant Transformers Including Related Patents published in 1973 by the Magnetic Metals Company of Camden, N.J. Ferroresonant transformers are also described and illustrated in copending patent applications Ser. No. 360,618 for Current and Voltage Balancing Circuits for Controllable Ferroresonant Power Systems and 370,281 for Ferroresonant Transformer Core.

A basic ferroresonant transformer of a type which may be utilized in the battery charger circuit of the invention is that shown and described in U.S. Pat. No. 2,996,656 granted in 1959 to Sola for Voltage Regulating Apparatus.

A Scott-T connection, as utilized in the battery charger circuit of the invention, is shown and described in the aforementioned copending patent application Ser. No. 360,618.

BACKGROUND OF THE INVENTION

The present invention relates to a ferroresonant transformer battery charger circuit.

Known battery charger circuits often produce sustained overvoltages on the battery being charged for long periods of time. The sustained overvoltages cause excessive heating in the battery and may damage it. Furthermore, a known type of ferroresonant transformer normally produces a characteristic which does not provide an adequate finish rate, so that the battery is not fully charged.

The ideal battery charger characteristic has a "finish rate" voltage of 2.7 volts per cell at zero amperes of current per 100 ampere-hours of battery capacity, a "float voltage" level of 2.42 volts per cell which holds constant between a "start rate" current of 21.5 amperes per 100 ampere-hours of battery capacity and the beginning of the finish rate at 5 amperes per 100 ampere-hours. Some battery charger circuits are compromises which establish a voltage higher than 2.42 volts per cell as the float voltage value, so that the battery may be more fully charged. This may damage the battery, especially when the charging cycle is repeated on a battery which is already fully charged or essentially charged at the beginning of the charge cycle.

In a known type of Scott-T connected transformer, either of the transformers may take all of the load and cause overheating.

The principal object of the invention is to provide a battery charger circuit of simple structure which overcomes the disadvantages of known battery chargers and produces a battery charger characteristic which is close to the ideal battery charger characteristic and is highly reliable.

An object of the invention is to provide a battery charger circuit which produces a finish rate characteristic of substantially 2.7 to 2.42 volts per cell from zero to 5 amperes per 100 ampere-hours of battery capacity and a float voltage level of 2.42 volts per cell.

Another object of the invention is to provide a battery charger circuit which utilizes a ferroresonant transformer to determine and stabilize a float voltage level of 2.42 volts per cell and an end point voltage of 2.7 volts per cell and thereby eliminate the possibility of sustained overvoltages on the battery for long periods of time with currents greater than the finish rate.

Still another object of the invention is to provide a battery charger circuit which will not damage a fully charged battery even if it is recycled with a full eight hour charge.

Another object of the invention is to provide a battery charger circuit utilizing a ferroresonant transformer which is current limited at the start rate thereby preventing overloading of the transformer.

Yet another object of the invention is to provide a battery charger circuit utilizing a Scott-T connection of ferroresonant transformers in three phase arrangement in which both transformers are current limited at a start rate value equal to half the combined start rate current thereby preventing overloading of either transformer to the point of overheating or damage, since both transformers may sustain the start rate current indefinitely without overheating. In a Scott-T connected transformer without the inherent current limiting of the battery charger circuit of the invention, either of the transformers may take all of the load and cause overheating.

An object of the invention is to provide a battery charger circuit which produces a substantially ideal battery charger characteristic without electronic components except the power rectifier diodes.

Another object of the invention is to provide a battery charger circuit having all the inherent advantages of a ferroresonant-rectifier power supply, such as low EMI characteristics, minimal distortion of the input current wave shapes which might cause inductive interference, maximum transient immunity of the power rectifier diodes from lightning and switching transients on the primary winding and full short-circuit protection of the output. None of these advantages are provided by a known type transformer-rectifier system having electronic controls.

BRIEF SUMMARY OF THE INVENTION

In accordance with the invention, a battery charger circuit for charging a battery from an AC power source comprises a ferroresonant transformer having a primary winding connected to an AC power source and a plurality of secondary windings. A first rectifier circuit is connected between the secondary windings of the transformer and one terminal of the battery for providing a first level of voltage. A second rectifier circuit is connected via an impedance in piggy-back with the first rectifier circuit between the secondary windings of the transformer and the one terminal of the battery for providing a second higher level of voltage thereby providing a close to ideal battery charger characteristic.

The impedance comprises a resistor connected between the second rectifier circuit and the battery for determining the finish rate current of the battery charger characteristic.

An inductor is connected between the secondary windings of the transformer and the second rectifier circuit for determining the finish rate current of the battery charger characteristic.

The transformer includes magnetic shunts separating the secondary windings from the primary winding and a ferrocapacitor connected across the secondary windings in series. The secondary windings include a first winding having a center tap and a pair of end terminals, a second winding having an end terminal connected to one end terminal of the first winding and another end terminal, a third winding having an end terminal connected to the other end terminal of the first winding and another end terminal and a fourth winding having an end terminal connected to the other end terminal of the second winding.

The first rectifier circuit comprises first and second diodes having anodes connected to the end terminals of the first secondary winding in a first full-wave rectifier bridge and cathodes connected in common to the positive polarity terminal of the battery and means connecting the center tap of the first secondary winding to the negative polarity terminal of the battery.

The second rectifier circuit comprises third and fourth diodes having anodes connected to the other end terminals of the second and third secondary windings in a second full-wave rectifier bridge and cathodes connected in common to the positive polarity terminal of the battery via the impedance.

An inductor has a winding connected between the anode of the third diode and the other end terminal of the third secondary winding and another winding connected between the anode of the fourth diode and the other end terminal of the second secondary winding for determining the finish rate current of the battery charger characteristic.

The start rate of the battery charger characteristic is determined by the inherent ferroresonant transformer characteristic and the finish rate current of the battery charger characteristic is determined by the impedance means.

A time control is connected to the primary winding of the transformer for deenergizing the transformer after a predetermined period of time.

In accordance with the invention, a battery charger circuit for charging a battery from a three phase AC power source comprises first and second ferroresonant transformers having primary windings connected to each other in Scott-T connection and connected to a three phase AC power source, each of the transformers having a plurality of secondary windings. A first rectifier circuit is connected between the secondary windings of the first transformer and one terminal of the battery. A second rectifier circuit including impedance means is connected in piggy-back with the first rectifier circuit between the secondary windings of the first transformer and the one terminal of the battery. A third rectifier circuit is connected between the secondary windings of the second transformer and the one terminal of the battery. A fourth rectifier circuit including impedance means is connected in piggy-back with the third rectifier circuit between the secondary windings of the second transformer and the one terminal of the battery. The first and third rectifier circuits provide a first level of voltage. The second and fourth rectifier circuits provide a second higher level of voltage thereby providing a close to ideal battery charger characteristic.

A first inductor is connected between the secondary windings of the first transformer and the second rectifier circuit and a second inductor is connected between the secondary windings of the second transformer and the fourth rectifier circuit. The first and second inductors determine the finish rate current of the battery charger characteristic.

Each of the first and second transformers includes magnetic shunts separating the secondary windings from the primary winding and a ferrocapacitor connected to the secondary windings. The secondary windings of each of the first and second transformers include a first winding having a center tap and a pair of end terminals, a second winding having an end terminal connected to one end terminal of the first winding and another end terminal, a third winding having an end terminal connected to the other end terminal of the first winding and another end terminal and a fourth winding having an end terminal connected to the other end terminal of the second winding.

Each of the first and third rectifier circuits comprises first and second diodes having anodes connected to the end terminals of the first secondary winding of the first and second transformers, respectively, in a first full-wave rectifier bridge and cathodes connected in common to the positive polarity terminal of the battery and means connecting the center tap of the first secondary winding of the first and second transformers to the negative polarity terminal of the battery.

Each of the second and fourth rectifier circuits comprises third and fourth diodes having anodes connected via the impedance means to the other end terminals of the second and third secondary windings of the first and second transformers, respectively, in a second full-wave rectifier bridge and cathodes connected in common with the cathodes of the first and second diodes to the positive polarity terminal of the battery.

A first inductor has a winding connected between the anode of the third diode and the other end terminal of the third secondary winding of the first transformer and another winding connected between the anode of the fourth diode and the other end terminal of the secondary winding of the first transformer. A second inductor has a winding connected between the anode of the third diode and the other end terminal of the third secondary winding of the second transformer and another winding connected between the anode of the fourth diode and the other end terminal of the secondary winding of the second transformer. The inductors determine the finish rate current of the battery charger characteristic.

The start rate of the battery charger characteristic is determined by the inherent ferroresonant transformer characteristic and the finish rate current of the battery charger characteristic is determined by the impedance means.

A time control is connected to the primary windings of first and second transformers for deenergizing the transformers after a predetermined period of time.

BRIEF DESCRIPTION OF THE DRAWINGS

In order that the invention may be readily carried into effect, it will now be described with reference to the accompanying drawing, wherein:

FIG. 2 is a mechanical embodiment of a ferroresonant transformer of the battery charger circuit of FIG. 1;

FIG. 3 is a graphical presentation of the ideal battery charger characteristic of a battery;

FIG. 4 is a graphical presentation of the battery charger characteristic produced by the battery charger circuit of the invention;

In the FIGS., the same components are identified by the same reference numerals.

DETAILED DESCRIPTION OF THE INVENTION

Figure 1:
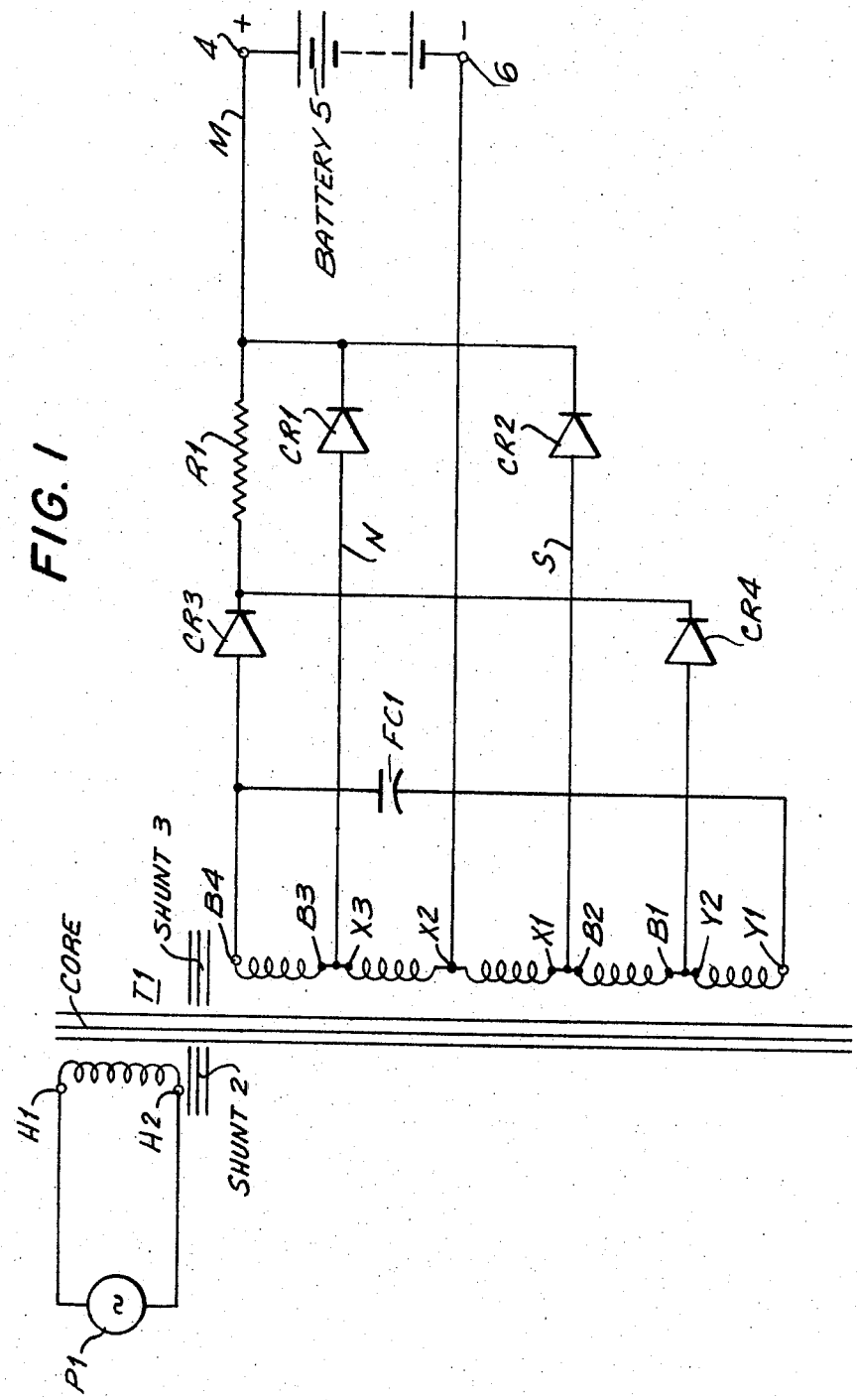
FIG. 1 is a circuit diagram of a single phase embodiment of the ferroresonant transformer battery charger circuit of the invention.

The single phase embodiment of FIG. 1 of the ferroresonant transformer battery charger circuit of the invention comprises a ferroresonant transformer T1 of any suitable two coil type such as, for example, one disclosed in the aforedescribed articles or patents or, more specifically, in U.S. Pat. no. 2,996,656. The ferroresonant transformer T1 has a primary coil H1, H2 connected to a single phase AC power source P1 and a secondary coil comprising a plurality of secondary windings Y1, Y2; B1, B2; X1, X2, X3 and B3, B4 on a core 1 (FIGS. 1 and 2).

The primary and secondary coils are separated from each other by magnetic shunts 2 and 3 (FIGS. 1 and 2). The secondary coil is in ferroresonance with a ferrocapacitor FC1 connected across the secondary windings Y1, Y2; B1, B2; X1, X2, X3 and B3, B4 in series. The ferroresonant action is described in the aforedescribed articles and patents. The result is that the voltage across the windings of the secondary coil is maintained approximately constant over a prescribed range of loads, as determined by the saturation flux density of the secondary coil magnetic core circuit.

The AC input is applied to the primary winding H1, H2. Load current is supplied through the windings X1, X2, X3; B1, B2 and B3, B4. First and second diodes CR1 and CR2 are connected in a first center-tapped rectifier circuit with the winding X1, X2, X3, of which X2 is the center tap. The cathodes of the diodes CR1 and CR2 are connected in common to the positive polarity terminal 4 of a battery 5 to be charged. Thus, the full-wave rectified voltage is applied directly to the battery 5, without filtering. The negative polarity terminal 6 of the battery 5 is connected to center tap X2. The voltage of the diodes CR1 and CR2 is the voltage of the windings X1, X2 and X3, only.

Third and fourth diodes CR3 and CR4 are connected in a second center-tapped rectifier circuit with the windings B1, B2 and B3, B4 in piggy-back with the first rectifier circuit. The cathodes of the diodes CR3 and CR4 are connected in common to the positive terminal 4 of the battery 5 via an impedance or resistor R1. The first rectifier circuit provides a first level of voltage and the second rectifier circuit provides a second higher level of voltage for the battery 5. The additional second level of voltage is available in the battery charger circuit of FIG. 1 because the winding B1, B2 adds to the winding X1, X2 during the first half cycle and the winding B3, B4 adds to the winding X2, X3 during the second half cycle.

The resistor R1 is connected in the second rectifier circuit between the diodes CR3 and CR4 and the battery 5.

FIG. 3 shows the ideal battery charger characteristic and FIG. 4 shows the actual battery charger characteristic. In each of FIGS. 3 and 4, the abscissa represents the load in amperes per 100 ampere hours of battery capacity and the ordinate represents the voltage in volts per cell.

If the diodes CR3 and CR4 are in non-conductive or open condition, so that all the load is supplied from the winding X1, X2, X3, the resultant load versus voltage characteristic is that shown by curve X in FIG. 4. The curve X is thus the battery charger characteristic of the circuit of FIG. 1 without the piggy-back diodes CR3 and CR4 and without the resistor R1, and is a typical ferroresonant characteristic.

If the resistor R1 is short-circuited and the diodes CR1 and CR2 are in non-conductive or open condition, the load is supplied completely via the diodes CR3 and CR4, and the resultant voltage versus load characteristic is that shown by curve Y in FIG. 4. The curve Y has a higher voltage over the normal load range than does the curve X, because of the additional voltage in the windings B1, B2 and B3, B4. The "current limit" load current of the curve Y is less than the curve X, since this is determined by a fixed volt-ampere value. That is, only a fixed magnitude of volt-amperes is delivered at the "pull out" value.

If both center-tapped rectifier circuits are connected and the resistor R1 is short-circuited, so that the resistance equals zero, all the load is supplied via the diodes CR3 and CR4, since they are supplied with a higher voltage value. In this mode, the diodes CR1 and CR2 remain in a reverse blocking condition and no current flows through them.

If the resistor R1 has a specified resistance value, the voltage versus load characteristic is shown by the curve Z in FIG. 4. The resistance value is selected to be such that at an output voltage of 2.42 volts per cell of the battery, approximately 5 ampere-hours of battery capacity flows. The ferroresonant transformer T1 is designed so that the X1, X2, X3 winding supplies approximately 21.5 amperes per 100 ampere-hours of battery capacity at 2.42 volts per cell. Therefore, for load values greater than 5 amperes per 100 ampere-hours of battery capacity, 5 amperes are supplied via the diodes CR3 and CR4 and 16.5 amperes are supplied via the diodes CR1 and CR2.

When the load decreases to a value of only 5 amperes per 100 ampere-hours, the voltage at a circuit point M becomes greater than the voltage at circuit points N and S, and the diodes CR1 and CR2 are switched to their reverse blocking condition. At load values below this, all the load current is supplied via the diodes CR3 and CR4 and the voltage versus load characteristic is determined by the resistor R1. At these load values, no current flows through the diodes CR1 and CR2.

The secondary coil winding Y1, Y2 is provided in order to increase the voltage across the ferrocapacitor FC1, so that more efficient use is made of the physical size of AC capacitors. That is, higher voltage capacitors can be made much smaller for a given magnitude of volt-amperes than can low voltage capacitors.

In the ideal battery charger characteristic, shown in FIG. 3, the start-rate current is 21.5 amperes per 100 ampere-hours of battery capacity. This constant current rate of charge is maintained until the battery terminal voltage reaches 2.42 volts per cell. The load current then begins decreasing at a constant voltage as the battery charges. When the load reaches 5 amperes per 100 ampere-hours, a finish-rate charging slope begins. The finish rate charging slope reaches 2.7 volts per cell at zero load. A known type of ferroresonant transformer-rectifier circuit cannot produce a characteristic which includes the finish rate. The best characteristic that can be produced is that shown by the curve X of FIG. 4.

The piggy-back diodes CR3 and CR4 produce a predictable end or final voltage level at zero current. The end voltage level is determined by the turns in the windings B1, B2 and B3, B4. The beginning of the finish rate current of 5 amperes per 100 ampere-hours is determined by the resistance value of the resistor R1. The resistor R1 is utilized when the battery 5 is of small size. An inductor is utilized when the battery 5 is of large size, as shown in FIGS. 5 and 6.

Figure 5:
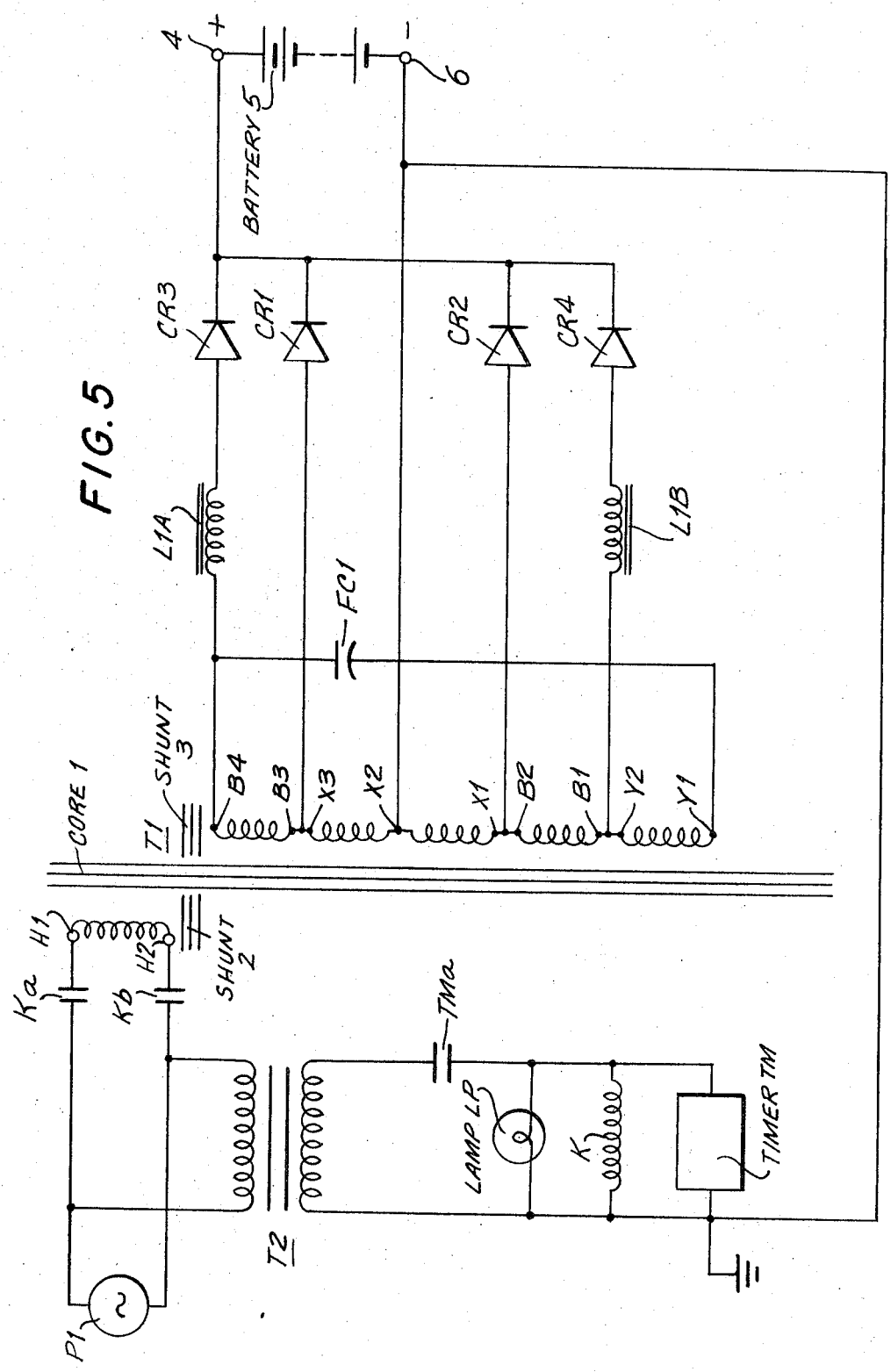
FIG. 5 is a circuit diagram of a modification of the battery charger circuit of FIG. 1.
Figure 6:
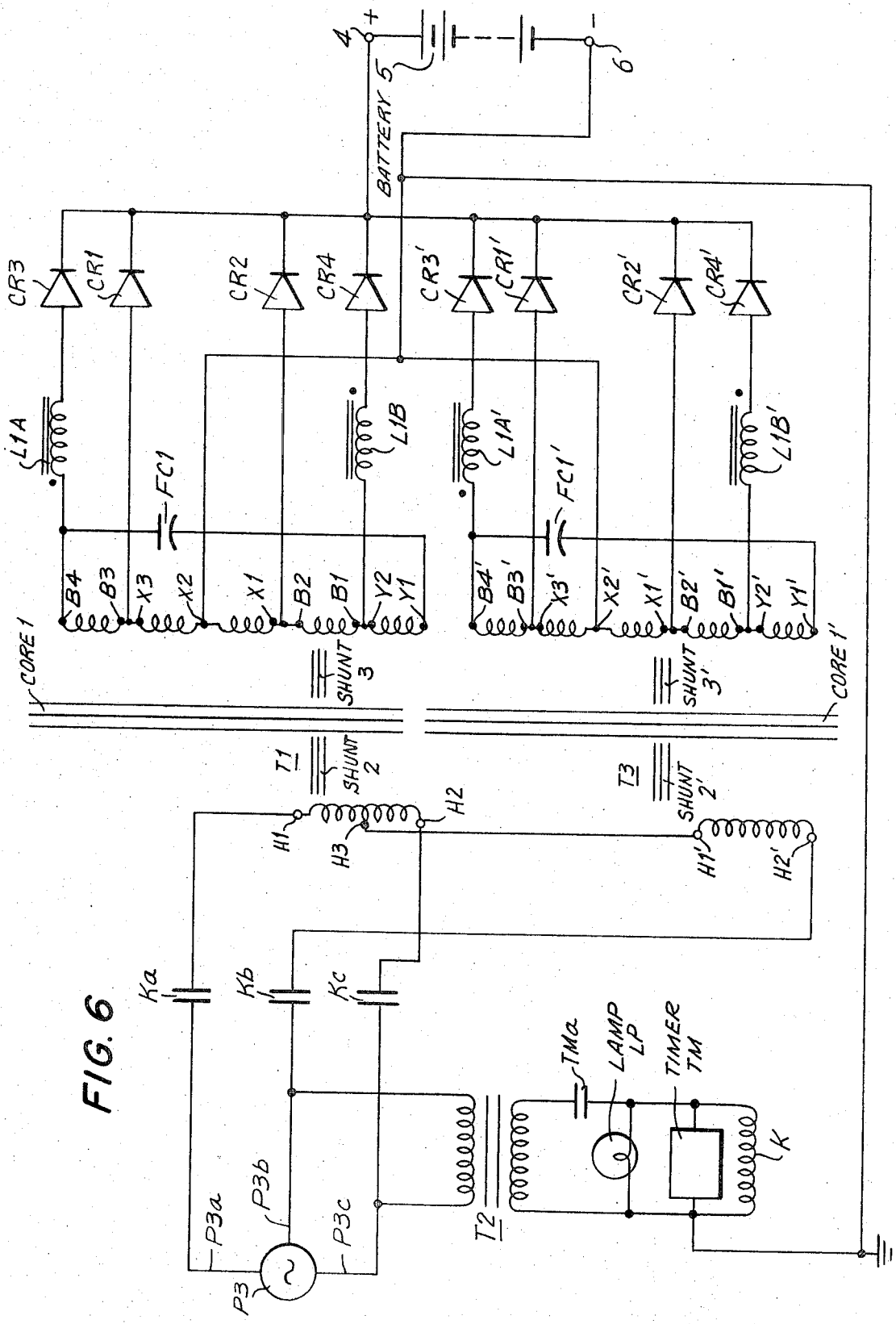
FIG. 6 is a circuit diagram of a three phase embodiment of the ferroresonant transformer battery charger circuit of the invention.

The modification of FIG. 5 is the same as the battery charger circuit of FIG. 1, except that the impedance comprises two inductor windings. Thus, the resistor R1 is replaced by an inductor having two windings L1A and L1B connected on the AC side of the second rectifier circuit. The inductor determines the finish rate. The inductor winding L1A is connected between the anode of the diode CR3 and the other end terminal B4 of the secondary winding B3, B4. The inductor winding L1B is connected between the anode of the diode CR4 and the other end terminal B1 of the secondary winding B1, B2.

A first half cycle of current flows through the inductor winding L1B and a second half cycle of current flows through the inductor winding L1A. In the circuit of FIG. 5, the DC flux cancels out in the core of the inductor L1A, L1B.

The modification of FIG. 5 has a time control circuit connected to the primary winding H1, H2 of the transformer T1 for deenergizing said transformer after a predetermined period of time determined by a timer TM. The time control circuit comprises the timer TM, which is set to a predetermined number of hours desired as the length of the charge cycle. The timer TM is connected in parallel with a relay energizing winding K and a lamp LP and the parallel connected components are connected across the secondary winding of an isolation step down transformer T2 which energizes said components via its primary winding from the AC power source P1. The timer TM, relay winding K and lamp LP are connected across the secondary winding of the transformer T2 via timer contacts TM*a*.

The relay winding K controls contacts K*a* and K*b*, which are connected in the lines connecting the AC power source P1 to the primary winding H1, H2 of the ferroresonant transformer T1. The timer TM is manually reset and is operated to the predetermined number of hours, to start the charge cycle. The timer contacts TM*a* close, thereby energizing the relay winding K. When the relay winding K is energized, it closes its contacts K*a* and K*b*, thereby energizing the primary winding H1, H2 to start the charging cycle. After the expiration of the predetermined number of hours, such as, for example, 8 hours, the timer TM opens its contacts TM*a*, thereby deenergizing the relay winding K. When the relay winding is deenergized, it opens the relay contacts K*a* and K*b* thereby removing power from the primary winding H1, H2 of the ferroresonant transformer T1.

The lamp LP is energized when the relay winding K is energized, thereby indicating when the battery charger circuit is operating or energized.

FIG. 6 shows a three phase embodiment of the ferroresonant transformer battery charger circuit of the invention. The battery charger circuit of FIG. 6 is the same as the battery charger circuit of FIG. 5, except that it has a three phase source of AC power P3 instead of a single phase AC power source, and comprises two ferroresonant transformers and two piggy-back rectifier circuits.

The ferroresonant transformers T1 and T3 are the same and are in Scott-T connection with each other and energized from the three phase power source P3 having lines P3*a*, P3*b* and P3*c*. The transformer T1 is the main transformer and is connected directly across the lines P3*a* and P3*c*. The transformer T3 is the 90° connected transformer and is connected between the line P3*b* and a center tap H3 of the primary coil H1, H2 of the transformer T1.

The Scott-T connection is the same as that described in the aforedescribed copending patent application Ser. No. 360,618.

The three phase embodiment of the battery charger circuit of FIG. 6 operates in the same manner as the single phase embodiment of FIG. 5.

While the invention has been described by means of specific examples and in specific embodiments, I do not wish to be limited thereto, for obvious modifications will occur to those skilled in the art without departing from the spirit and scope of the invention.

I claim:

1. A battery charger circuit for charging a battery from an AC power source, said battery charger circuit comprising a ferroresonant transformer having a primary winding connected to an AC power source and a plurality of secondary windings;

a first rectifier circuit connected between the secondary windings of the transformer and one terminal of the battery for providing a first level of voltage;

an impedance; and a second rectifier circuit connected via the impedance in piggy-back with the first rectifier circuit between the secondary windings of the transformer and the one terminal of the battery for providing a second higher level of voltage thereby providing a close to ideal battery charger characteristic, the impedance comprising a resistor connected between the second rectifier circuit and the battery for determining the finish rate current of the battery charger characteristic and the start rate of the battery charger characteristic being determined by the inherent ferroresonant transformer characteristic.

2. A battery charger circuit for charging a battery from an AC power source, said battery charger circuit comprising a ferroresonant transformer having a primary winding connected to an AC power source and a plurality of secondary windings;

a first rectifier circuit connected between the secondary windings of the transformer and one terminal of the battery for providing a first level of voltage;

an impedance;

a second rectifier circuit connected via the impedance in piggy-back with the first rectifier circuit between the secondary windings of the transformer and the one terminal of the battery for providing a second higher level of voltage thereby providing a close to ideal battery charger characteristic; and an inductor connected between the secondary windings of the transformer and the second rectifier circuit for determining the finish rate current of the battery charger characteristic.

3. A battery charger circuit for charging a battery from an AC power source, said battery charger circuit comprising a ferroresonant transformer having a primary winding connected to an AC power source and a plurality of secondary windings, said transformer including magnetic shunts separating the secondary windings from the primary winding and a ferrocapacitor connected across the secondary windings in series and the secondary windings include a first winding having a center tap and a pair of end terminals, a second winding having an end terminal connected to one end terminal of the first winding and another end terminal, a third winding having an end terminal connected to the other end terminal of the first winding and another end terminal and a fourth winding having an end terminal connected to the other end terminal of the second winding;

a first rectifier circuit connected between the secondary windings of the transformer and one terminal of the battery for providing a first level of voltage;

an impedance; and a second rectifier circuit connected via the impedance in piggy-back with the first rectifier circuit between the secondary windings of the transformer and the one terminal of the battery for providing a second higher level of voltage thereby providing a close to ideal battery charger characteristic.

4. A battery charger circuit as claimed in claim 3, wherein the first rectifier circuit comprises first and second diodes having anodes connected to the end terminals of the first secondary winding in a first full-wave rectifier bridge and cathodes connected in common to the positive polarity terminal of the battery and means connecting the center tap of the first secondary winding to the negative polarity terminal of the battery.

5. A battery charger circuit as claimed in claim 4, wherein the second rectifier circuit comprises third and fourth diodes having anodes connected to the other end terminals of the second and third secondary windings in a second full-wave rectifier bridge and cathodes connected in common to the positive polarity terminal of the battery via the impedance.

6. A battery charger circuit as claimed in claim 5, further comprising an inductor having a winding connected between the anode of the third diode and the other end terminal of the third secondary winding and another winding connected between the anode of the fourth diode and the other end terminal of the second secondary winding for determining the finish rate current of the battery charger characteristic.

7. A battery charger circuit as claimed in claim 5, further comprising time control means connected to the primary winding of the transformer for deenergizing the transformer after a predetermined period of time.

8. A battery charger circuit for charging a battery from a three phase AC power source, said battery charger circuit comprising first and second ferroresonant transformers having primary windings connected to each other in Scott-T connection and connected to a three phase AC power source, each of the transformers having a plurality of secondary windings;

a first rectifier circuit connected between the secondary windings of the first transformer and one terminal of the battery;

impedance means;

a second rectifier circuit including the impedance means connected in piggy-back with the first rectifier circuit between the secondary windings of the first transformer and the one terminal of the battery;

a third rectifier circuit connected between the secondary windings of the second transformer and the one terminal of the battery, the first and third rectifier circuits providing a first rate of voltage, the first and third rectifier circuits providing a first level of voltage; and a fourth rectifier circuit including the impedance means connected in piggy-back with the third rectifier circuit between the secondary windings of the second transformer and the one terminal of the battery, the second and fourth rectifier circuits providing a second higher level of voltage thereby providing a close to ideal battery charger characteristic.

9. A battery charger circuit as claimed in claim 8, further comprising a first inductor connected between the secondary windings of the first transformer and the second rectifier circuit and a second inductor connected between the secondary windings of the second transformer and the fourth rectifier circuit, the first and second inductors determining the finish rate current of the battery charger characteristic.

10. A battery charger circuit as claimed in claim 8, wherein each of the first and second transformers includes magnetic shunts separating the secondary windings from the primary winding and a ferrocapacitor connected to the secondary windings and the secondary windings of each of the first and second transformers include a first winding having a center tap and a pair of end terminals, a second winding having an end terminal connected to one end terminal of the first winding and another end terminal, a third winding having an end terminal connected to the other end terminal of the first winding and another end terminal and a fourth winding having an end terminal connected to the other end terminal of the second winding.

11. A battery charger circuit as claimed in claim 8, wherein the start rate of the battery charger characteristic is determined by the inherent ferroresonant transformer characteristic and the finish rate current of the battery charger characteristic is determined by the impedance means.

12. A battery charger circuit as claimed in claim 10, wherein each of the first and third rectifier circuits comprises first and second diodes having anodes connected to the end terminals of the first secondary winding of the first and second transformers, respectively, in a first full-wave rectifier bridge and cathodes connected in common to the positive polarity terminal of the battery and means connecting the center tap of the first secondary winding of the first and second transformers to the negative polarity terminal of the battery.

13. A battery charger circuit as claimed in claim 12, wherein each of the second and fourth rectifier circuits comprises third and fourth diodes having anodes connected via the impedance means to the other end terminals of the second and third secondary windings of the first and second transformers, respectively, in a second full-wave rectifier bridge and cathodes connected in common with the cathodes of the first and second diodes to the positive polarity terminal of the battery.

14. A battery charger circuit as claimed in claim 13, further comprising first and second inductors, the first inductor having a winding connected between the anode of the third diode and the other end terminal of the third secondary winding of the first transformer and another winding connected between the anode of the fourth diode and the other end terminal of the secondary winding of the first transformer, and the second inductor having a winding connected between the anode of the third diode and the other end terminal of the third secondary winding of the second transformer and another winding connected between the anode of the fourth diode and the other end terminal of the secondary winding of the second transformer, the inductors determining the finish rate current of the battery charger characteristic.

15. A battery charger circuit as claimed in claim 13, further comprising time control means connected to the primary windings of first and second transformers for deenergizing the transformers after a predetermined period of time.

* * * * *